United States Patent [19]
Robinson

[11] Patent Number: 5,703,650
[45] Date of Patent: Dec. 30, 1997

[54] METHOD OF AND DEVICE FOR ESTIMATING MOTION IN A VIDEO SIGNAL

[75] Inventor: Roger N. Robinson, Buckinghamshire, England

[73] Assignee: Vistek Electronics Ltd., Buckinghamshire, United Kingdom

[21] Appl. No.: 550,692

[22] Filed: Oct. 31, 1995

[30] Foreign Application Priority Data

Oct. 31, 1994 [GB] United Kingdom ............... 9422018

[51] Int. Cl.[6] .................. H04N 7/32; H04N 7/48
[52] U.S. Cl. ............... 348/413; 348/425; 348/699
[58] Field of Search .................. 348/699, 392, 348/402, 407, 413, 416, 424, 425; H04N 7/32, 7/48

[56] References Cited

U.S. PATENT DOCUMENTS

| | | | |
|---|---|---|---|
| 5,105,271 | 4/1992 | Niihara | 348/699 |
| 5,278,915 | 1/1994 | Chupeau | 348/413 |
| 5,576,772 | 11/1996 | Kondo | 348/699 |

*Primary Examiner*—Howard W. Britton
*Attorney, Agent, or Firm*—Westman, Champlin & Kelly, P.A.

[57] ABSTRACT

The method described enables a high accuracy of motion measurement to be achieved with simple circuitry and overcomes some of the most important sources of error introduced in other systems. Many of the previous techniques may be extended by using a hierarchical technique to improve the accuracy or resolution of a simple estimator e.g. hierarchical block matching or successive approximate gradient systems. The invention described in this patent introduces novel techniques of weighted-sample area matching, effectively giving soft boundaries to the picture areas used to assess motion within a picture, and/or with a technique of adjusting the picture resolution between successive stages of motion measurement. The combination of these techniques reduces many of the limitations of previous techniques.

21 Claims, 9 Drawing Sheets

DIAGRAM OF MOTION MEASUREMENT SYSTEM

MOTION PREDICTION BETWEEN STAGES OF ORTHOGANAL MOTION SAMPLING ARRAY

IF MOTION MEASURED AT FIRST SEARCH AT A, B, C etc. IS a, b, c etc. MOTION PREDICTION FOR SECOND SEARCH IS $$AT\ Y = \frac{a+b+d+e}{4}$$

$$AT\ E = e$$

MOTION PREDICTION BETWEEN ORTHOGANAL FIRST SEARCH AND OFFSET (QUINCUNX) SECOND SEARCH

METHOD OF AND DEVICE FOR ESTIMATING MOTION IN A VIDEO SIGNAL

The present invention relates to an improved method of and device for measuring motion in a video signal. Such motion is usually expressed as a motion vector field in which the motion of each element of the picture is expressed as a motion vector conventionally resolved along two orthogonal axes, e.g. horizontal and vertical motion axes.

PRIOR ART

Many of the previous techniques may be extended by using a hierarchical system to improve the accuracy or resolution of a simple estimator e.g. hierarchical block matching or successive approximate gradient systems.

Prior art techniques for measurement of motion in a video signal includes block matching, pixel recursive methods (Gradient methods) and phase correlation. Since the present invention provides an improvement of block matching, a brief discussion of block matching follows herein under. Details of the phase correlation method can be found in U.K. Patent No. GB2188510A, and derails of the pixel recursive method can be found in the Article by Shimano et al. entitled 'Movement Compensated Standards Converter Using Motion Vectors' in the Proceedings of The Society of Motion Picture and Television Engineers. 1989.

BLOCK MATCHING

Figure 1:
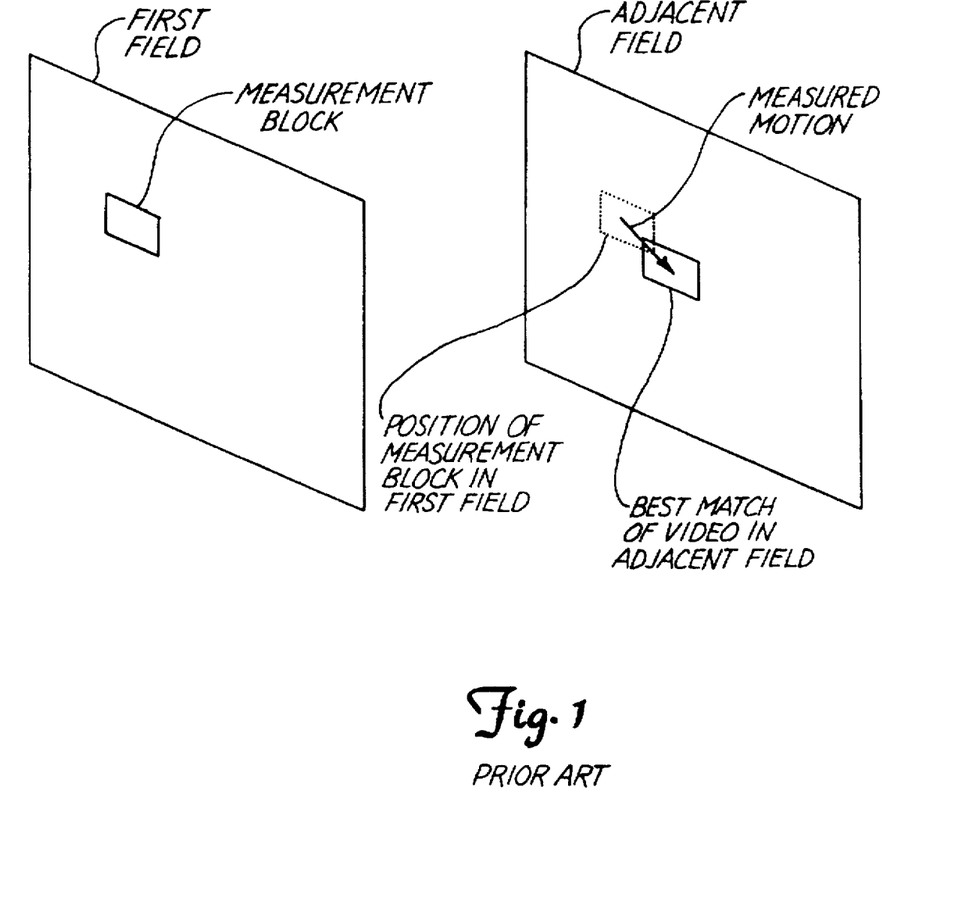
FIG. 1 is a diagram of the prior art of block matching.

In a block matching system the picture is divided into a series of rectangular sections (blocks). The motion of the video within each block is measured by comparing each block with a selection of similar sized blocks derived from an adjacent (proceeding or preceding) field of the video signal. This is illustrated in FIG. 1. Matching is measured by evaluating the difference between the magnitude of each pixel of the current field $P_o$ with the correspondingly placed pixel $P_a$ within the block of the adjacent field. The modulus of the difference between these pixels, $|P_o-P_a|$, is then summed over all n pixels in the block to give an error value: error=$\Sigma|P_o-P_a|$. For For each current field block repeated searches are carried out with different positions of block in the adjacent field and the error value is evaluated for each search. The block position which gives the smallest error is selected as the best match. The most likely motion vector for pixels contained within the block of the current field is then calculated from the spatial displacement between the current field block and the best match block of the adjacent field.

An extension of this technique is taught by Weiss and Christensson in PCT Patent Application No. SE92/00219 entitled "Method for estimating motion contents in video signals". This technique involves repeated searches using progressively smaller block sizes with prediction from the early coarse searches to provide an initial search estimate for later searches. This is known as, primarily, a hierarchical search and sometimes a logarithmic search.

The technique described by Weiss and Christensson provides a great increase in accuracy over previous block matching techniques but suffers some disadvantages which cause measurement error. In particular it is found that pictures which contain areas of regular repeating patterns may cause spurious motion measurement errors and changes in scene illumination or picture brightness can cause errors.

BACKGROUND

When using a block matching motion estimation technique it is frequently desirable to limit the number of searches carried out before a best match is defined. In a practical system using a finite number of trial searches, a search which is close to the correct position of the block in the adjacent field may give rise to a large error value, $\Sigma|P_o-P_a|$ if the block contains significant fine picture detail. This detail corresponds to components of the video signal with high horizontal or vertical frequency.

A more reliable indication of the proximity of a correct match may be achieved if the input video signal is spatially filtered, to reduce the high horizontal and vertical frequency components of the signal, before the block-match estimations are carried out. If however a hierarchical search technique is used, then the high frequency components of the signal are required to give adequate resolution when small block displacements are tested around an approximately correct position. In the system described, the amount of detail present in the video signal is progressively increased in successive searches.

Another source of error encountered in block matching motion estimators is introduced when the video signal represents a scene in which objects are moving at different speeds, and hence may obscure one another. For example, if a measurement block in one field contains an area of a picture background and if in the next field a small area of the corresponding picture block is obscured by an object moving in front, then a significant error may occur in the matching of the corresponding blocks.

A technique is described in which the significance of a difference between corresponding pixels of two blocks which are being compared is scaled according to the position of the pixel in the block pattern. This technique reduces the effect of discontinuities in motion at the extremes of the block.

The invention described in this patent introduces novel techniques of weighted-sample area matching, effectively giving soft boundaries to the picture areas used to assess motion within a picture: together with a technique of adjusting the picture resolution between successive stages of motion measurement. The combination of these techniques reduces many of the limitations of previous techniques.

According to the present invention there is provided a device for estimating motion in an electronic visual signal comprising:

a first channel for receiving the signal and a second channel for receiving a comparison signal;

a first filter arranged to receive said signal;

a second filter arranged to receive said comparison signal;

a motion estimator coupled to said filters to receive said filtered signal and said comparison filtered signal for estimating the motion in the signal, characterised by a further first filter for prefiltering the signal and providing a prefiltered signal to said first filter, a further second filter for prefiltering the comparison signal and providing a prefiltered comparison signal to said second filter and a further motion estimator coupled to said further filters and said motion estimator for estimating motion in the signal at a higher resolution and than the motion estimator.

Also according to the present invention there is provided a motion estimator for estimating motion in an electronic visual signal, comprising:

a memory for storing a pattern of pixels in the signal;

a second memory for storing the pattern of pixels in a comparison signal;

logic means to derive a motion value=$\Sigma|P_o-P_a|$ where $P_o$ is the magnitude of motion of a pixel in the signal and $P_a$ is the magnitude of motion of the pixel in the comparison signal, characterised by multiplier means for applying weighted factors to the motion value dependent upon the position of the pixel in the pattern.

The embodiments of the present invention will now be described with reference to the accompanying drawings, of which.

DESCRIPTION OF THE INVENTION

Figure 2:
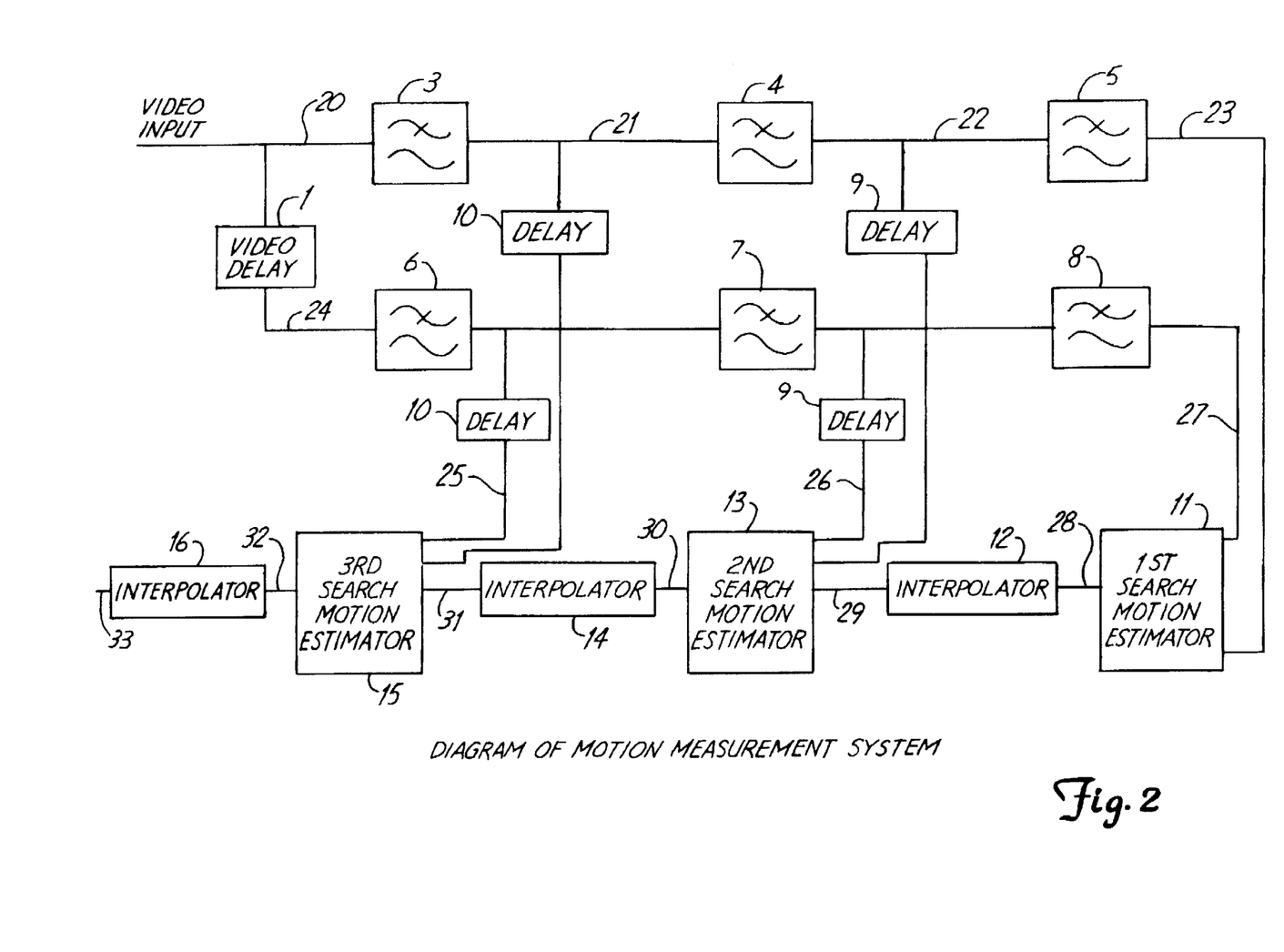
FIG. 2 is a block diagram of the motion measurement system.

FIG. 2 shows a block diagram one embodiment of the present invention. Hereinafter, when the description refers to video signal that is meant to include all electronic forms of visual data.

Figure 8:
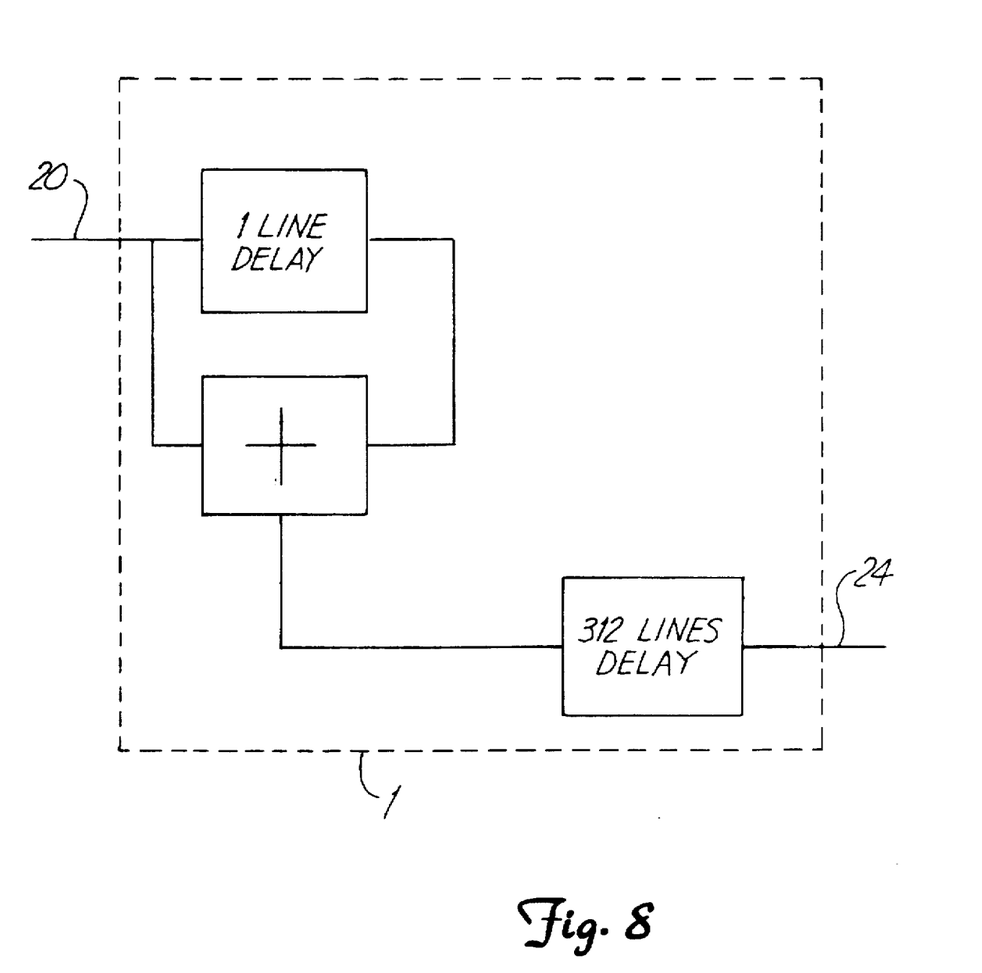
FIG. 8 is a diagram of a field delay.

An input video signal 20 is applied to a video delay 1 which has a delay of one television frame or one television field. If the signal has an interlaced format, such as a 625-line or 525-line television signal, then a de-interlacing circuit is included in the field delay as shown in FIG. 8.

The input signal 20 is also applied to a two dimensional low-pass spatial filter 3, the output of which 21, is connected to a further low-pass spatial filter 4. The output of which 22 is connected to a further low-pass spatial filter 5 which in turn provides an output 23. Filtered outputs 21, 22 and 23 thus represent increasingly filtered versions of the input video 20.

A similar cascaded series of filters 6, 7 and 8, connected to the output of video delay 1 are used to provide increasingly filtered versions 25, 26 and 27 of the delayed video signal 24.

The output 23 of low-pass filter 5, representing the most filtered version of the input signal, and the output 27 of low-pass filter 8 representing the most filtered version of the delayed video signal, are connected to a first motion estimator 11.

Figure 9A:
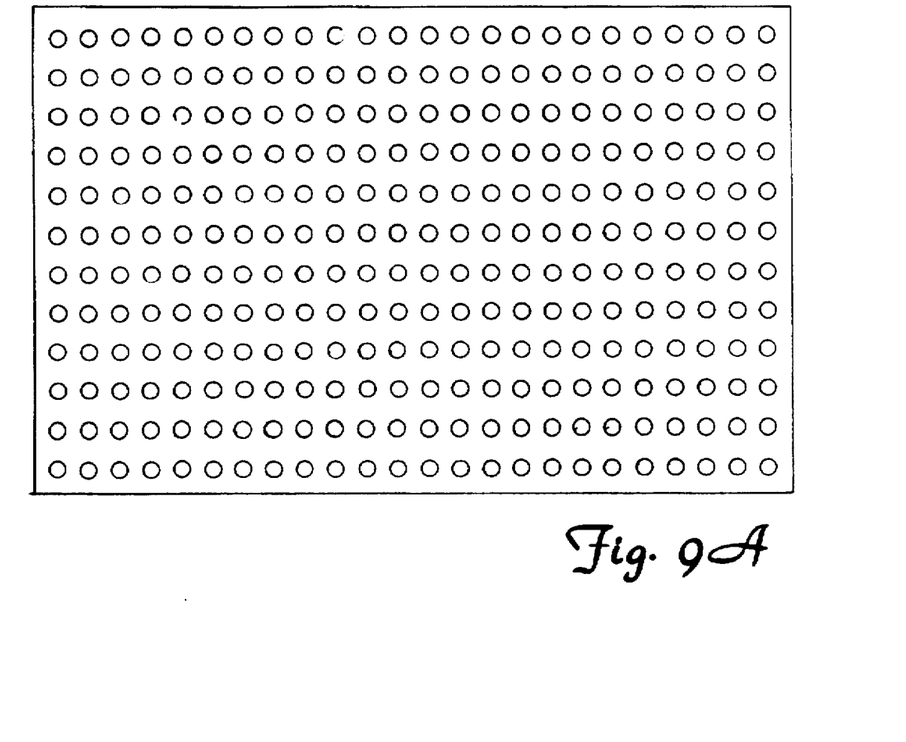
FIG. 9A is a diagram of an orthogonal measurement array.
Figure 9B:
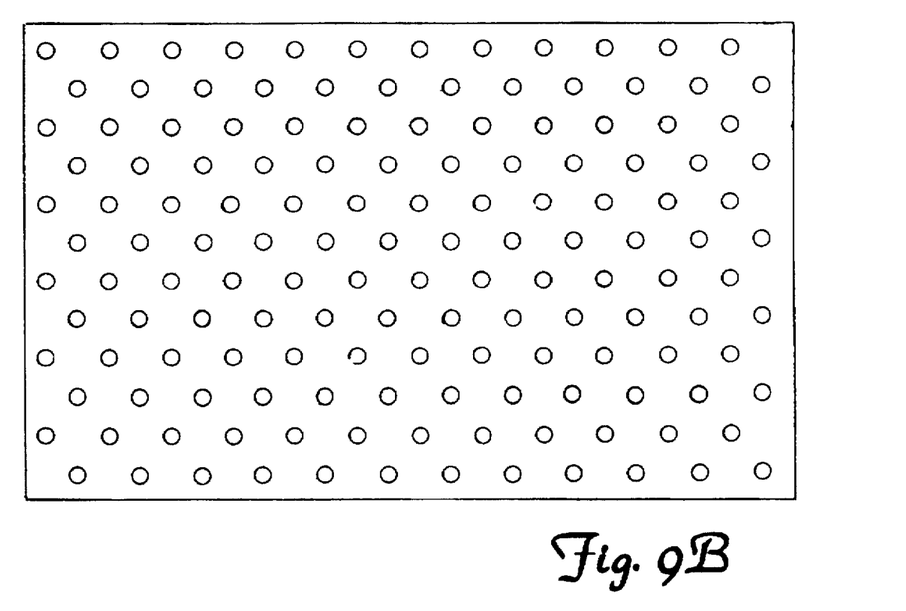
FIG. 9B is a diagram of a quincunx measurement array.

This first motion estimator 11 is arranged to measure the motion within the picture at a number of points in the picture. These measurement points may be defined by a first motion measurement array. Such a motion measurement array is shown diagramatically in FIG. 9A, this shows an ,orthogonal pattern of points within a picture at which a motion measurement is made. In practice a larger number of points may be preferred. Typically for a 625-line television system an array of 30 points horizontally across the picture by 24 points vertically could be used or a block of 24 pixels across and 12 pixels vertically could be used in this stage of estimation. An alternative arrangement of a motion measurement array, in which the motion measurement points are offset in a quincunx formation, is shown in FIG. 9B: again more points may be preferred in a practical system as explained for an orthogonal array.

The output from the first motion estimator is thus a series of motion measurements at points spatially defined by the first motion measurement array. This represents a low-accuracy vector field sampled at low spatial resolution.

Figure 7A:
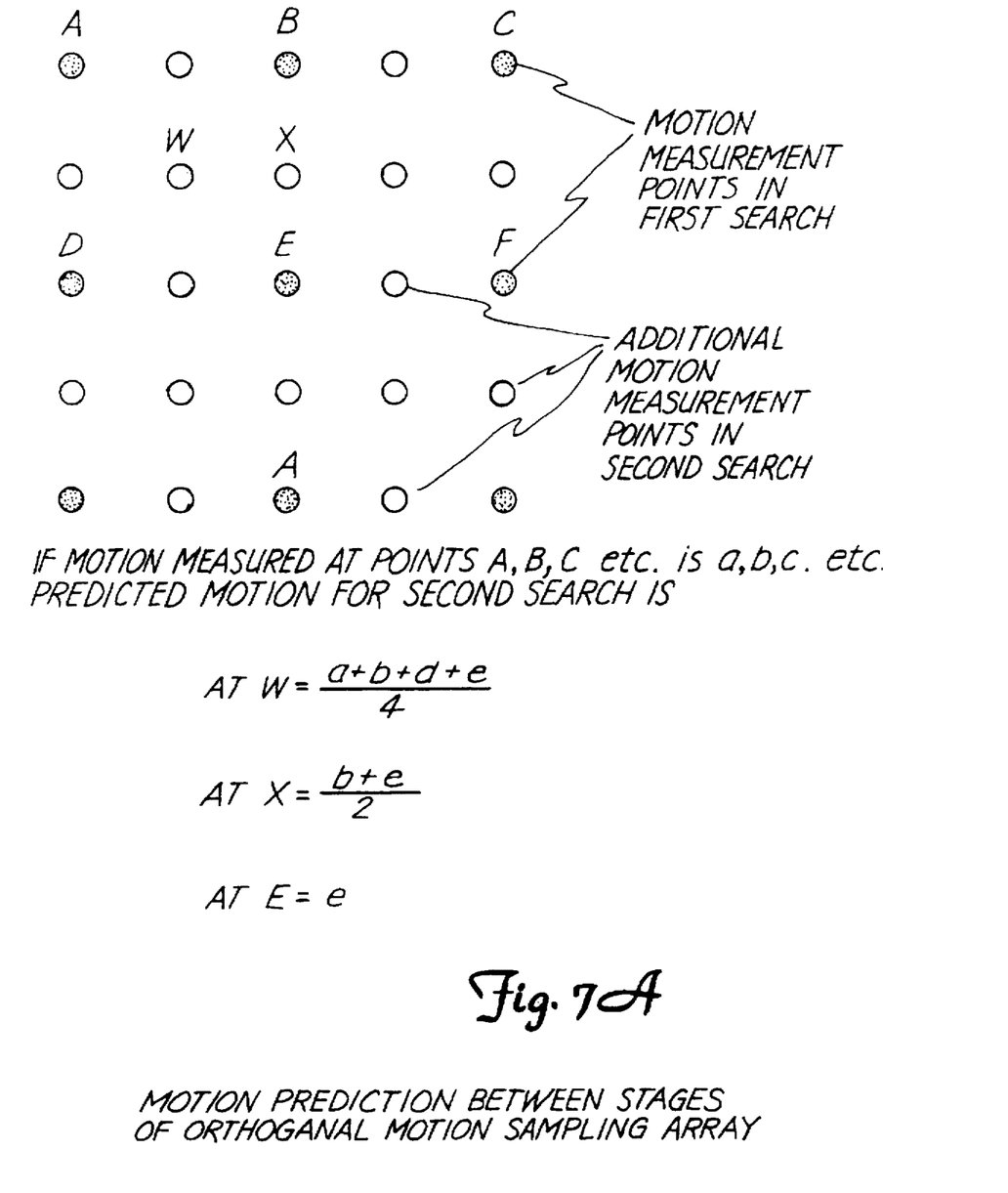
FIG. 7A shows an example of the operation of the interpolator with an orthogonal measurement array.
Figure 7B:
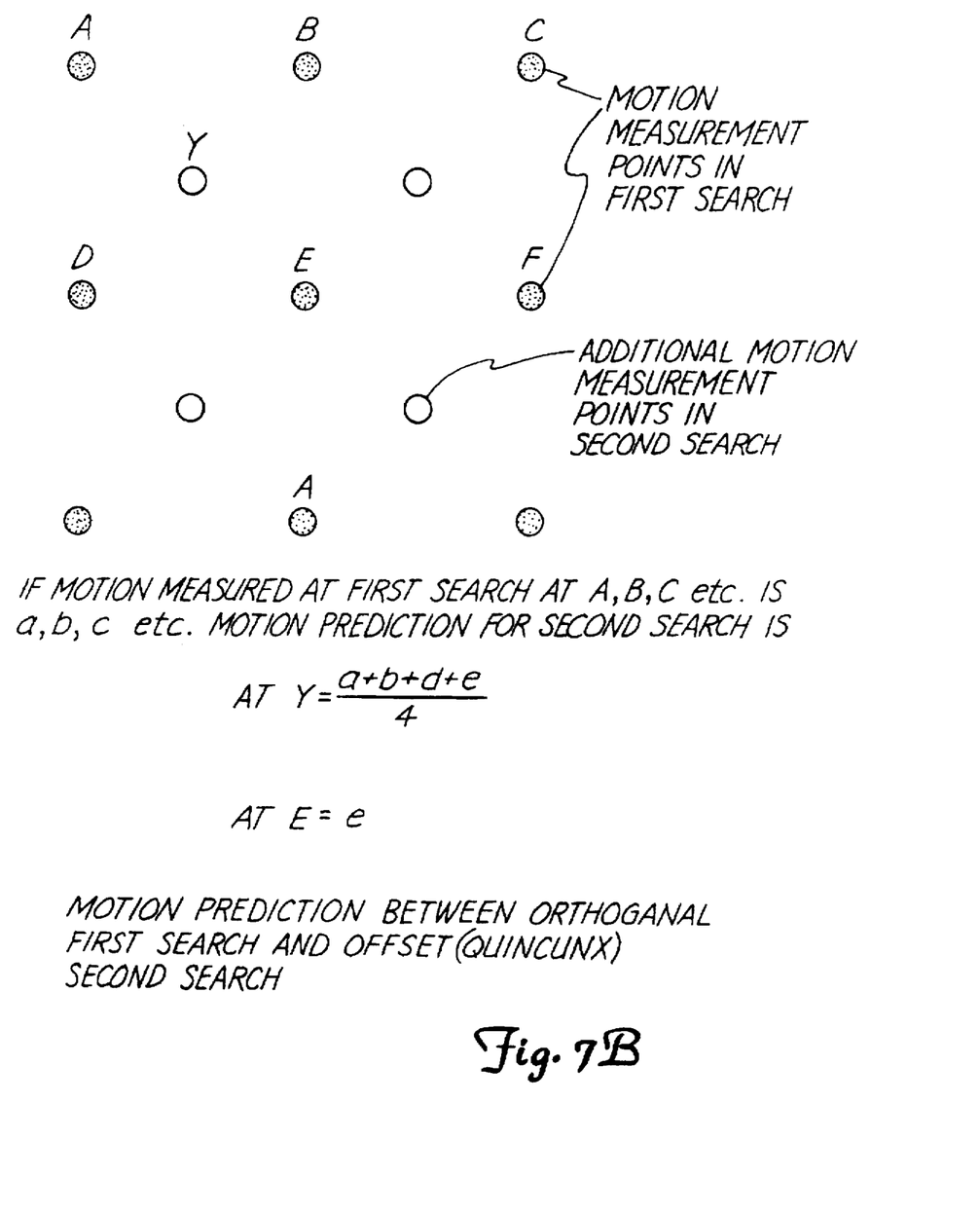
FIG. 7B shows an example of the operation of the interpolator with a quincunx measurement array.

The output 28 of the first motion estimator is connected to a spatial interpolator 12. The function of the interpolator is to provide an output 29 which predicts the motion at intermediate points in the picture. These points may be defined by a second motion measurement array, typically having more horizontal and more vertical sampling points than the first motion measurement array. The process of increasing the number of sample points to provide an estimate of motion at points in a higher resolution, second motion measurement array is shown in FIGS. 7A and 7B.

It is also envisaged that the interpolator 12 may provide a number of motion predictions for each of the intermediate points. The motion at intermediate points may be estimated by averaging the surrounding motion measurements defined at points on the first motion measurement array, or by providing a number of estimates each based on the motion measured at points on the first motion measurement array.

Interpolated signal 29 is connected to a second motion estimator 13 where it is used to provide predicted values of the motion at the spatial sample points defined by the second motion measurement array.

Filtered versions of the input signal 20, derived from low-pass filters 4 and 7 respectively, are delayed by delay circuits 9 to provide outputs 26 and are connected to the second motion estimator 13. The delay of circuits 9 are arranged to compensate for the cascaded insertion delay of filters 5 and 8 and the first search estimator 11 and interpolator 12.

The second motion estimator is thus fed with versions of the input signal and the delayed input signal which have been subjected to less spatial filtering and hence have a higher spatial resolution than signals 23 and 27 fed to the first motion estimator. Predicted values of the motion at picture points defined by the second motion measurement array are also provided from the interpolator 12. The function of the second motion estimator is to provide a series of motion measurements at points in the picture defined by the second motion measurement array. An output 30 of the second motion estimator consists of a series of motion measurements corresponding to a vector field which has increased accuracy and is sampled at an increased spatial resolution.

If the initial block used in the first search is 24 by 12 pixels, then the second motion estimator may act on a block of 12 by 6 pixels. Moreover, the motion measurements centre upon the most likely motion as determined by the first motion estimator.

The output 30 of second motion estimator 13 is connected to a further spatial interpolator 14 which provides an output 31 with further increased spatial sampling resolution at picture points corresponding to a third motion measurement array. This output forms a motion prediction for a third motion estimator 15.

Versions of the input signal 20 from low pass filters 3 and 6 respectively, and delayed via delays 10 to provide signal 25 provide inputs to the third motion estimator 15. Delays 10 provide compensation for the timing difference between signals 21, 25 and the prediction signal 31. The function of the third motion estimator is similar to that previously described except that it measures motion at points in the picture defined by the third motion measurement array. The output of the third motion estimator 15 thus provides an output 32 which consists of a motion vector field with further enhanced accuracy and resolution. This output 32 may be used directly or connected to a further interpolator 16 to provide an output 33 with further increased spatial sampling resolution.

The previous description and FIG. 2 describes a motion measurement arrangement with three motion estimators. However it can be readily understood that a motion measurement arrangement could be made using this principle with any number of cascaded estimation stages.

It is to be appreciated that since the signal is filtered, this enables only a sub-set of the pixels to be processed by the motion estimator thereby reducing the number of pixels in question. This leads to more efficient processing.

Figure 3:
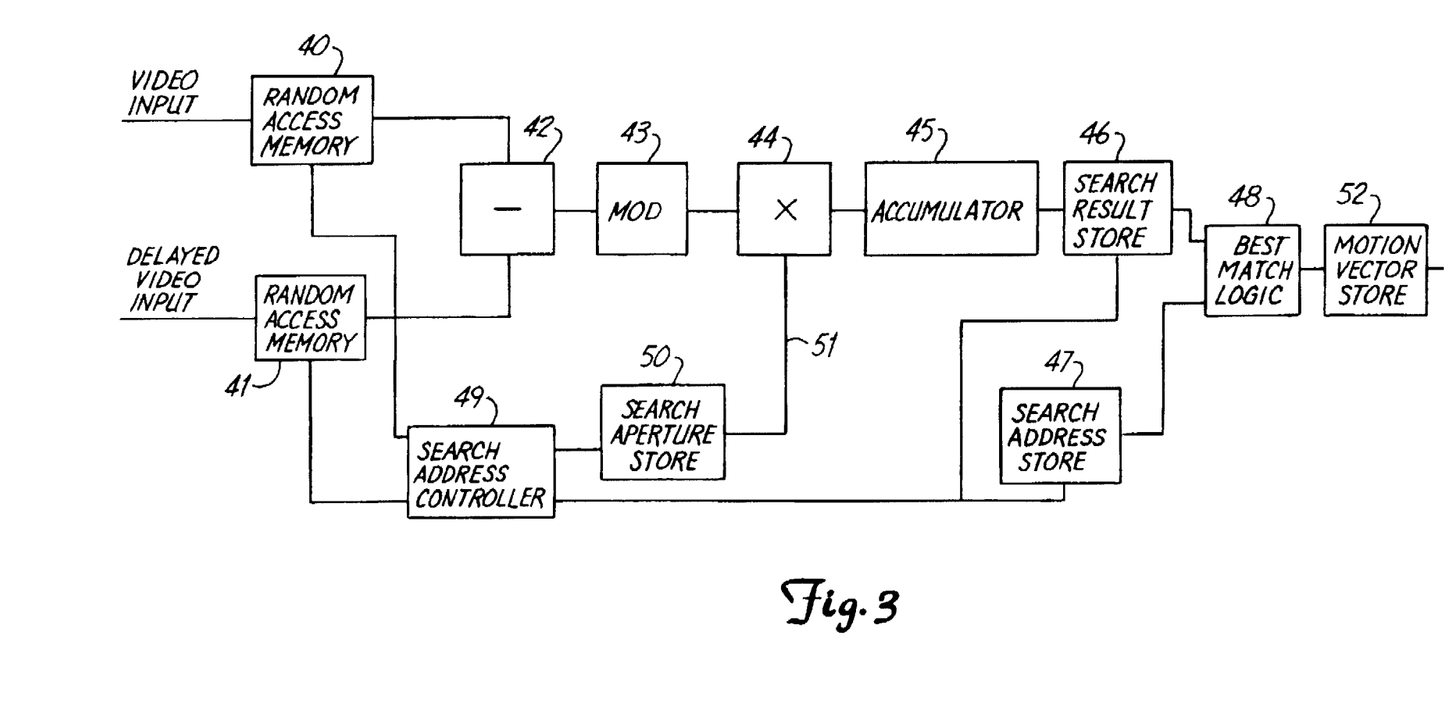
FIG. 3 is a block diagram of a motion estimator.

A block diagram of a particularly suitable motion estimator for use in this arrangement is shown in FIG. 3.

A first video input signal is connected to a first random access memory 40 and a second video signal corresponding to the first video signal delayed by one television field is connected to a second random access memory 41. Addresses to both first and second random access memories are provided by a search address controller 49. The search address controller allocates both write addresses, to define where each sample of the video signal is written into the memories, and read addresses, such that a pattern of picture elements can be read from the memories in sequential order.

The outputs from memories 40 and 41 are connected to a subtractor circuit 42 which provides an output signal corresponding to the difference between the outputs from the two memories. The polarity of this difference is suppressed by a modulus circuit 43 connected to the output of the subtractor. The output of the modulus circuit is connected to a multiplier 44 which multiplies each pixel of the difference signal from modulus circuit 43 by a weighting factor 51.

The weighting factors are derived from a search aperture store 50 which is controlled by the search address controller 49. For each address within the pattern of selected picture elements provided to the video memories 40 and 41, the store address controller can select a different weighting factor 51 from search aperture store 50.

Figure 4:
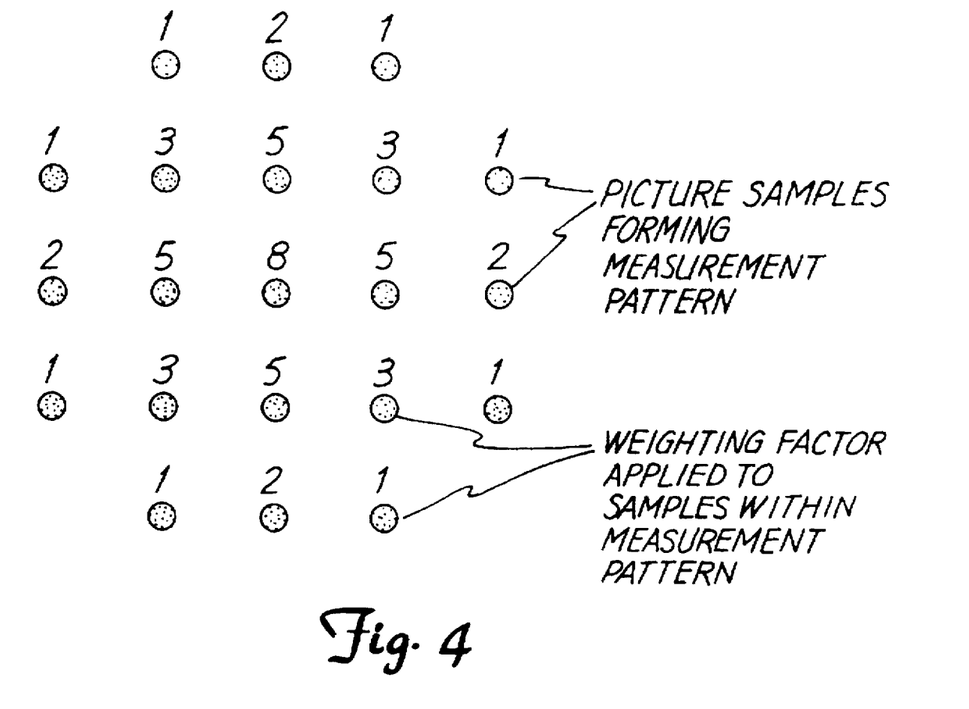
FIG. 4 shows a pattern of samples within a measurement pattern.
Figure 5:
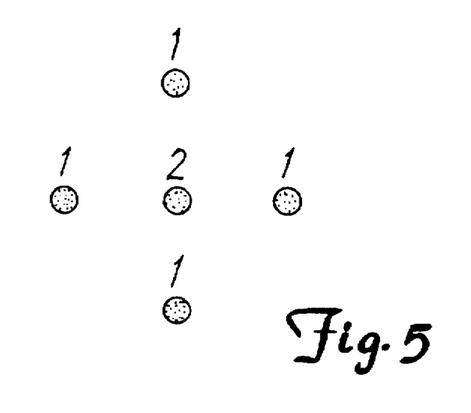
FIG. 5 shows an alternative measurement pattern.

FIG. 4 shows an example of the spatial pattern of samples which can be selected from the memories 40, 41 together with an example of the weighting factor applied to each sample from the search aperture store 50. FIG. 5 shows a smaller pattern of samples which could be used. The purpose of the weighting factors is to increase the significance of samples from near the centre of the search pattern and correspondingly reduce the significance of samples further from the centre of the search pattern.

The output of the multiplier 44 is connected to accumulator circuit 45 which is arranged to add together all the weighted difference values derived from the pixels within the search pattern to provide a total difference signal for each pattern of pixels read from memories 40, 41. This total difference may be stored in the search result store 46.

The operation of the circuit is described as follows: A pattern of samples of the current video field is addressed in random access memory 40 and simultaneously a similar pattern of samples corresponding to the previous video field is addressed in random access memory 41. The values derived for each picture element in the pattern from the two memories 40, 41 are subtracted and the modulus of the difference multiplied by a weighting coefficient is then added in accumulator 45. When the modulus of the difference between each corresponding picture element in the pattern has been accumulated the final sum is transferred to search memory store 46. The position of the search pattern mapped into one of the memories is then moved horizontally, vertically or diagonally to a neighbouring position and the sum of the weighted picture element differences evaluated as before, and the result again transferred to the search result store.

This process is repeated a number of times: each occasion with a different spatial offset of the pattern of samples addressed in the video memories 40, 41. For each repeat of this process the magnitude and direction of the spatial offset of the pattern between the memories 40, 41 is stored in the search address store 47 and the corresponding accumulated difference value stored in search result store 46.

When a number of successive measurements with different spatial offsets of the pattern have been made the results stored in the search result store are evaluated by a best match logic 48 to find the minimum value held. When the minimum value has been found, the corresponding address in the search address store 47 is found. The value read from this store contains the magnitude and direction of the spatial address offset value which, applied to the video memories 40, 41, gave the best match of the picture elements contained in patterns accessed in memories 40, 41. This spatial offset provides the best estimate of the motion in the picture at a point centred on the centre of the pattern of picture elements read from memories 40, 41. The horizontal and vertical components of the address offset at which a best match is found, then give a direct measurement of motion in terms of pixels moved horizontally and lines moved vertically per field.

In order to reduce the number of different spatial offsets which must be evaluated in order to provide a motion measurement with adequate accuracy, one or more predictions of probable motion can be fed to the search address controller. Searches for a best match of measurement pattern are then made at points in the picture offset by a displacement corresponding to the predicted motion over one field, and then at points surrounding this initial displacement. This process can then be repeated for several different possible predictions. The final best estimate of the motion of the point at the centre of the measurement pattern is given by the total address displacement at which a best match is found.

As described, the addresses to either video store 40 or delayed video store 41 can be offset from an original starting position for each search. The point at which the motion is measured is usually taken as the centre of the pattern in the store in which the pattern remains fixed during the search for a best match. An alternative mode of operation is for the addresses in both the video store 40 and delayed video store 41 to be both spatially offset from an original reference position by address shifts in offset directions. If the spatial offset of the addresses in the two stores 40, 41 are equal in magnitude and opposite in direction, this provides a best estimate of the motion in the picture that would have occurred at a time mid-way between the origination of the first video signal and the delayed video signal.

If the motion is to be assessed at some other point in time between the origination of the first video signal and the delayed video signal, the magnitude of the spatial address offset applied to the two video memories may be adjusted as follows:

If the time of origination of the first video signed is $t_1$ and the time of origination of the delayed video signal is $t_2$ and the time at which the motion to be evaluated is t then the address offset to the first video store is given by:

$$\text{Offset } 1 = (t - t_1)/(t_2 - t_1) \cdot V$$

and the offset spatial offset applied to delayed video memory 41 is given by:

$$\text{Offset } 2 = (t_2 - t)/(t_2 - t_1) \cdot V$$

Where V is the total offset value which is stored in the search address store 47.

The point in the picture at which motion is being measured remains the reference picture point about which the two store address patterns are being moved. Such measurement of motion based on an instant in between television fields can be critical if the motion measurement is made for the purpose of constructing accurate images at times in between the input television fields. Typical examples of this type of processing are television standards conversion and slow-motion processing.

The method of motion measurement described so far assesses the motion occurring at one point in the picture. By repeating the process at different points in the picture array of motion measurement, points can be built up. This array of results is fed sequentially from the best match logic 48 into a motion vector store 52. The output from the store can be read out to provide predictions for refinement in a further stage of motion estimation, or by repeating the motion estimation process over the whole field and an array of motion measurements can be built up to represent a complete sampled motion vector field.

Figure 6A:
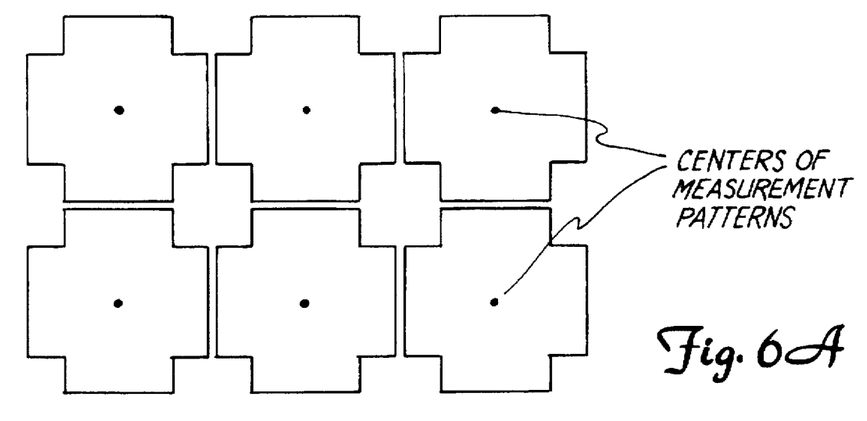
FIG. 6A shows an arrangement of successive, non-overlapping, measurement patterns.
Figure 6B:
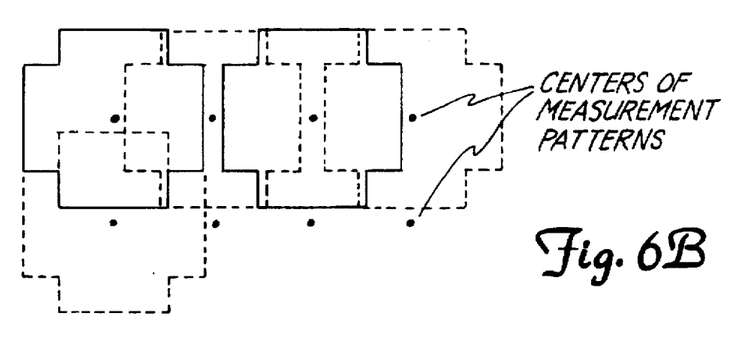
FIG. 6B shows an arrangement of successive, overlapping, measurement patterns.
Figure 6C:
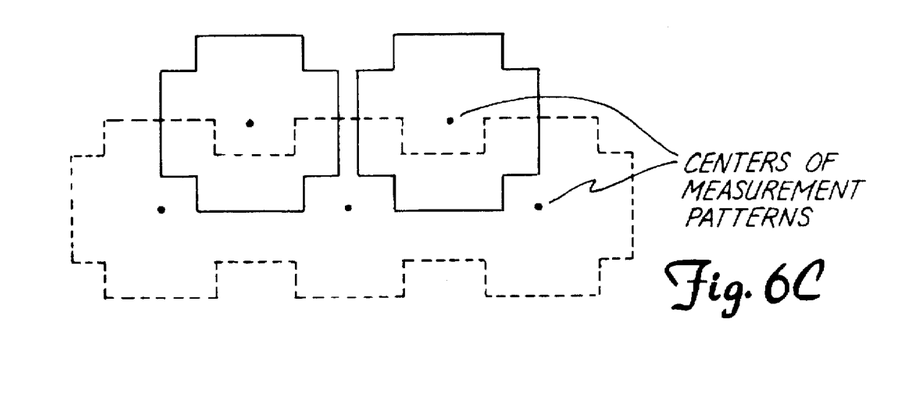
FIG. 6C shows an alternative arrangement of successive, overlapping, measurement patterns.

The array of points chosen to make motion measurements within the field can be such that the patterns of picture elements read from the video memories are either spatially adjacent in position at successive measurement points as shown in FIG. 6A, or preferably, that the patterns of picture elements selected for measurement of motion at one point overlap the pattern of points selected for measurement of motion at other points in the array as shown in FIGS. 6B or 6C.

FIG. 2 shows an arrangement of successive motion estimators each giving a motion prediction to the next stage of motion estimation with later stages working at a higher resolution than the previous estimator. The first motion estimator 11 of FIG. 2 provides a vector field, sampled on a relatively widely spaced array of motion sample points, which is used as a basis of predictions for the motion to be redefined at a higher accuracy on a more closely spaced array of picture points in the second motion estimator.

To provide the predictions on the more closely spaced array, the vector field derived from the first estimator must be spatially interpolated to provide additional sample points. To accomplish this a weighted sum of the surrounding picture points is taken to provide a prediction of the motion at intermediate points. Simple examples of the weighting functions that could be used are shown in FIG. 7. Alternatively multiple predictions can be made from the values of motion measured at surrounding points.

A further enhancement of the motion measurement system is the addition of temporal motion prediction. To accomplish this, the results of motion measurement from all of the motion estimator stages 11, 13, 15 of FIG. 2 may be connected to a measurement store. A weighted sum of the motion measurements made by the motion estimator stages may be read from this store and used to form a prediction of the motion in the picture one field later. This temporal prediction may be used in combination with the spatial prediction from earlier motion estimators as previously described.

The foregoing description has been given by way of example only and it will be appreciated by a person skilled in the art that modifications can be made without departing from the scope of the present invention.

For example, instead of having a series of cascaded filters and motion estimators horizontally, the cascade can also be vertical. That is to say, a signal and comparison signal are each applied to a plurality of filters and their outputs are applied to one or more motion estimators. The motion estimators may provide predictions for subsequent motion estimators.

Another alternative is for the comparison signal to be merely the signal offset by a fraction of one line of the video. This technique is similar to that already known in Standards Conversion technology.

I claim:

1. A device for estimating motion in an electronic visual signal, comprising:

a first channel for receiving the signal and a second channel for receiving a comparison signal;

a first filter arranged to receive said signal;

a second filter arranged to receive said comparison signal;

a motion estimator coupled to said filters to receive said filtered signal and said comparison filtered signal for estimating the motion in the signal; and a further first filter for prefiltering the signal and providing a prefiltered signal to said first filter, a further second filter for prefiltering the comparison signal and providing a prefiltered comparison signal to said second filter and a further motion estimator coupled to said further filters and arranged to receive the output of said motion estimator for estimating motion in the signal at a higher resolution than the motion estimator.

2. A device as claimed in claim 1, in which said motion estimator provides a vector field to represent motion and further comprising an interpolator coupled to the motion estimator for providing an interpolated vector field of higher resolution than the vector field by estimating intermediate points in the vector field.

3. A device as claimed in claim 2, further comprising a cascade of a plurality of further filters and further motion estimators.

4. A device as claimed in claim 3, further comprising a further interpolator for the or each further motion estimator.

5. A device as claimed in claim 1, in which said comparison signal comprises the signal delayed by one field or frame.

6. A device as claimed in claim 1, in which said comparison signal comprises the signal shifted by a fraction of one line of video.

7. A device as claimed in claim 6, in which the signal is also shifted by an mount represented by $=(t-t_1)/(t_2-t_1) \cdot V$ and the comparison signal is shifted by an amount represented by $=(t_2-t)/(t_2-t_1) \cdot V$ where $t_1$ represents a point of time in the signal;

$t_2$ represents the point of time in the comparison signal; and

V is the total amount of shifted of the signal and comparison signal; and t is the point of time at which to estimate motion.

8. A device as claimed in claim 1, in which said motion estimator or the or each further motion estimator applies weighted factors to a pattern of points in the signal.

9. A device as claimed in claim 1, in which said motion estimator comprises a memory for storing a pattern of pixels in the signal;

a second memory for storing the pattern of pixels in a comparison signal;

logic means to derive a motion value $=\Sigma|P_o-P_a|$ where $P_o$ is the magnitude of a pixel in the pattern of the signal and $P_a$ is the magnitude of the pixel in the pattern of the comparison signal, characterised by the multiplier means for applying weighted factors to the motion value dependent upon the position of the pixel in the pattern.

10. A device for estimating motion in an electronic visual signal, comprising:

a first channel for receiving the signal and a second channel for receiving a comparison signal;

a first filter arranged to receive said signal;

a second filter arranged to receive said comparison signal;

a motion estimator coupled to said filters to receive said filtered signal and said comparison filtered signal for estimating the motion in the signal;

a further first filter for prefiltering the signal and providing a prefiltered signal to said first filter, a further second filter for prefiltering the comparison signal and providing a prefiltered comparison signal to said second filter and a further motion estimator coupled to said further filters and arranged to receive the output of said motion estimator for estimating motion in the signal at a higher resolution than the motion estimator;

a cascade of a plurality of further filters and further motion estimators; and in which said motion estimator or the or each further motion estimator applies weighted factors to a pattern of points in the signal.

11. A device as claimed in claim 10, further comprising an interpolator for the motion estimator and a further interpolator for the or each further motion estimator.

12. A device as chimed in claim 10, in which said comparison signal comprises the signal delayed by one field or frame.

13. A device as claimed in claim 10, in which said comparison signal comprises the signal shifted by a fraction of one line of video.

14. A device as claimed in claim 13, in which the signal is also shifted by an amount represented by$=(t-t_1)/(t_2-t_1) \cdot V$ and the comparison signal is shifted by an amount represented by$=(t_2-t)/(t_2-t_1) \cdot V$ where $t_1$ represents a point of time in the signal;

$t_2$ represents the point of time in the comparison signal; and

V is the total amount of shifted of the signal and comparison signal; and t is the point of time at which to estimate motion.

15. A device as claimed in claim 10, in which said motion estimator or the or each motion estimator comprises:

a memory for storing a pattern of pixels in the signal;

a second memory for storing the pattern of pixels in a comparison signal;

logic means to derive a motion value $=\Sigma|P_o-P_a|$ where $P_o$ is the magnitude of a pixel in the pattern of the signal and $P_a$ is the magnitude of the pixel in the pattern of the comparison signal, characterised by the multiplier means for applying weighted factors to the motion value dependent upon the position of the pixel in the pattern.

16. A motion estimator for estimating motion in an electronic visual signal, comprising:

a memory for storing a pattern of pixels in the signal;

a second memory for storing the pattern of pixels in a comparison signal;

logic means to derive a motion value $=\Sigma|P_o-P_a|$ where $P_o$ is the magnitude of a pixel in the pattern of the signal and $P_a$ is the magnitude of the pixel in the pattern of the comparison signal, characterised by multiplier means for applying weighted factors to the motion value dependent upon the position of the pixel in the pattern.

17. A motion estimator as claimed in claim 16, further comprising a store for storing a number of motion values and a best match logic coupled to the store for determining the minimum motion value.

18. A method of estimating motion using a motion estimator as claimed in claim 16, in which a motion value is derived for a number of patterns of pixels.

19. A method as claimed in claim 18, in which the patterns of pixels are offset from each other.

20. A method as claimed in claim 18 in which the weighted factors are varied to derive a number of motion values.

21. A method as claimed in claim 20, in which the number of motion values derived is limited by a prediction value.

* * * * *

UNITED STATES PATENT AND TRADEMARK OFFICE
CERTIFICATE OF CORRECTION

PATENT NO. : 5,703,650
DATED : December 30, 1997
INVENTOR(S) : Roger N. Robinson It is certified that error appears in the above-indentified patent and that said Letters Patent is hereby corrected as shown below:

Col. 8, line 56, change "mount" to --amount--.

Signed and Sealed this

Twenty-eighth Day of April, 1998

Attest:

BRUCE LEHMAN

Attesting Officer

Commissioner of Patents and Trademarks